(12) United States Patent
Matsuzawa et al.

(10) Patent No.: US 9,110,162 B2
(45) Date of Patent: Aug. 18, 2015

(54) ANTENNA COVER

(75) Inventors: Shin-ichiro Matsuzawa, Nisshin (JP); Masaru Ogawa, Seto (JP); Koji Takeuchi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 264 days.

(21) Appl. No.: 13/812,046

(22) PCT Filed: Jul. 19, 2011

(86) PCT No.: PCT/IB2011/001664
§ 371 (c)(1), (2), (4) Date: Jan. 24, 2013

(87) PCT Pub. No.: WO2012/014032
PCT Pub. Date: Feb. 2, 2012

(65) Prior Publication Data
US 2013/0229299 A1 Sep. 5, 2013

(30) Foreign Application Priority Data
Jul. 30, 2010 (JP) .................. 2010-172764

(51) Int. Cl.
*G01S 7/03* (2006.01)
*H01Q 1/42* (2006.01)
(Continued)

(52) U.S. Cl.
CPC .............. *G01S 13/42* (2013.01); *H01Q 1/3233* (2013.01); *H01Q 1/421* (2013.01); *G01S 7/03* (2013.01); *H01Q 1/42* (2013.01); *H01Q 1/526* (2013.01); *H01Q 15/02* (2013.01)

(58) Field of Classification Search
CPC ........... G01S 7/03; G01S 7/032; G01S 13/06; G01S 13/4454; H01Q 1/42–1/428; H01Q 1/526; H01Q 15/02–15/12; H01Q 13/02–13/04

USPC .......... 342/175; 343/753, 762–786, 844, 872, 343/893, 909, 910, 911 L, 911 R
See application file for complete search history.

(56) References Cited

U.S. PATENT DOCUMENTS 3,314,070 A * 4/1967 Youngren ...................... 343/708
3,761,937 A * 9/1973 Tricoles et al. ............... 343/770
(Continued)

FOREIGN PATENT DOCUMENTS

CN  101076920 A  11/2007
EP  1 249 892 A2  10/2002
(Continued)

OTHER PUBLICATIONS

English Translation of Description and Claims of JP 2009278501 A.*
(Continued)

*Primary Examiner* — Peter Bythrow
(74) *Attorney, Agent, or Firm* — Sughrue Mion, PLLC (57) ABSTRACT

An antenna cover (1) for a radar (2) for a vehicle has a rectangular parallelepiped shape, having a flat cover top (10) that faces a microstrip antenna (21a, 21b) of the radar (2) and a sidewall (11) that covers the microstrip antenna (21a, 21b) sideways. The sidewall (11) is located out of the range where the electromagnetic waves to be received by the microstrip antenna (21a, 21b) are directly received. An inner face (11a) of the sidewall (11) is at a right angle to the cover top (10). An outer face (11b) of the sidewall (11) is at a constant angle θ larger than 0 degree but smaller than 90 degrees, to the inner face (11a) of the sidewall (11). The sidewall (11) is structured such that its thickness increases toward the side where the microstrip antenna (21a, 21b) is present.

6 Claims, 10 Drawing Sheets (51) Int. Cl.
*G01S 13/42* (2006.01)
*H01Q 1/32* (2006.01)
*H01Q 15/02* (2006.01)
*H01Q 1/52* (2006.01)

(56) References Cited

U.S. PATENT DOCUMENTS

| | | | |
|---|---|---|---|
| 4,148,039 A * | 4/1979 | Lunden | 343/872 |
| 5,689,276 A * | 11/1997 | Uematsu et al. | 343/872 |
| 6,275,182 B1 * | 8/2001 | Meierbachtol | 342/174 |
| 6,337,661 B1 | 1/2002 | Kondoh et al. | |
| 6,674,412 B1 * | 1/2004 | Schmidt et al. | 343/872 |
| 6,833,806 B2 * | 12/2004 | Nagasaku et al. | 342/27 |
| 6,927,744 B2 * | 8/2005 | Saito et al. | 343/895 |
| 6,933,881 B2 * | 8/2005 | Shinoda et al. | 342/70 |
| 6,937,184 B2 * | 8/2005 | Fujieda et al. | 342/70 |
| 6,947,003 B2 * | 9/2005 | Huor | 343/770 |
| 7,126,525 B2 * | 10/2006 | Suzuki et al. | 342/70 |
| 7,242,365 B1 * | 7/2007 | Boatman et al. | 343/872 |
| 7,580,003 B1 * | 8/2009 | Davis et al. | 343/872 |
| 7,940,207 B1 * | 5/2011 | Kienzle et al. | 342/124 |
| 8,130,167 B2 * | 3/2012 | Glabe et al. | 343/872 |
| 8,633,865 B2 * | 1/2014 | Miyagawa et al. | 343/872 |
| 8,674,899 B2 * | 3/2014 | Ando et al. | 343/872 |
| 8,855,730 B2 * | 10/2014 | Sanford | 455/575.7 |
| 2001/0040524 A1 * | 11/2001 | Suzuki et al. | 342/70 |
| 2002/0149520 A1 * | 10/2002 | Laubner et al. | 343/700 MS |
| 2003/0043080 A1 * | 3/2003 | Saito et al. | 343/702 |
| 2003/0090427 A1 * | 5/2003 | Solberg et al. | 343/787 |
| 2004/0056818 A1 * | 3/2004 | Sledkov | 343/797 |
| 2005/0110627 A1 * | 5/2005 | Sabet et al. | 340/447 |
| 2007/0139291 A1 * | 6/2007 | Sabet et al. | 343/872 |
| 2007/0241962 A1 * | 10/2007 | Shinoda et al. | 342/361 |
| 2008/0316126 A1 | 12/2008 | Voigtlander | |
| 2010/0188304 A1 * | 7/2010 | Clymer et al. | 343/753 |

FOREIGN PATENT DOCUMENTS

| | | | |
|---|---|---|---|
| JP | 63-187708 A | | 8/1988 |
| JP | 1-155704 A | | 6/1989 |
| JP | 4-240902 A | | 8/1992 |
| JP | 06-140823 A | | 5/1994 |
| JP | 08-097625 A | | 4/1996 |
| JP | 2000-307305 A | | 11/2000 |
| JP | 2003-158465 A | | 5/2003 |
| JP | 2009-278501 A | | 11/2009 |
| JP | 2009278501 A | * | 11/2009 |
| JP | 2009-284141 A | | 12/2009 |
| WO | 2005/055366 A1 | | 6/2005 |

OTHER PUBLICATIONS

Partial Translation of an Office Action, dated Jan. 14, 2013, issued by the Japanese Patent Office, in counterpart Application No. 2010-172764.

International Search Report for corresponding International Patent Application No. PCT/IB2011/001664 mailed Nov. 22, 2011.

* cited by examiner

FIG. 10 tion # ANTENNA COVER

BACKGROUND OF THE INVENTION

1. Field of the Invention

The invention relates to an antenna cover for covering an antenna, and it particularly relates to an antenna cover that lessens cyclically wavy distortions of the antenna directivity.

2. Description of Related Art

An antenna cover is often provided to protect an antenna from various external influences and impacts, and the like. Examples of such an antenna cover are described in WO2005/055366, Japanese Patent Application Publication No. 06-140823 (JP-A-6-140823), and Japanese Patent Application Publication No. 2009-278501 (JP-A-2009-278501).

WO2005/055366 describes providing a radio wave absorber at an inner face of a sidewall of a rectangular parallelepiped cover such that the radio wave absorber absorbs the unwanted radio waves propagating horizontally.

JP-A-6-140823 describes a cover that has a flat center portion located above an antenna and an outer peripheral portion that is formed by bending the outer periphery of the center portion. According to this cover, the sensitivities in low elevation angle directions are enhanced with the outer peripheral portion made larger in thickness than the center portion.

JP-A-2009-278501 describes a cover that is structured such that the lower the elevation angle, the larger the thickness of the cover, thus enhancing the sensitivities in low elevation angle directions.

SUMMARY OF THE INVENTION

If an antenna is covered with a cover having a flat cover top for covering the antenna from above, it causes cyclically wavy distortions of the antenna directivity. As a result of various researches and studies on the cause of this problem, it has been revealed that the antenna directivity distortions are related also to the portions of the cover that are located out of the transmission-receiving range of the antenna. Further, it has been discovered that there exist electromagnetic wave components that cannot penetrate the cover top of the cover due to the total reflection critical angle, etc., but propagate laterally (i.e., in the directions parallel or substantially parallel to the plane in which the antenna extends) and penetrate the sidewall of the antenna, and therefore interferences occur between the electromagnetic waves propagating perpendicularly and the electromagnetic waves propagating laterally, causing cyclically wavy distortions of the antenna directivity, that is, variation of the antenna directivity. Such distortions are intensified as the beam width of the antenna is increased to provide a wider transmission-receiving angle.

None of WO2005/055366, JP-A-6-140823, and JP-A-2009-278501 addresses, referring to the descriptions in them, such cyclically wavy distortions of an antenna directivity, which are caused by an antenna cover such as the one described above, and naturally, they do not present any method for lessening such distortions.

The invention provides an antenna cover for lessening antenna directivity distortions.

A first aspect of the invention relates to an antenna cover that covers an antenna for transmitting or receiving electromagnetic waves, having: a cover top that is flat and faces the antenna; and a sidewall that covers the antenna sideways and meets an edge of the cover top at a given angle thereto, wherein the sidewall is located out of a transmission-receiving range of the antenna, and an electric thickness (i.e., a value obtained by dividing the thickness of the sidewall by the relative permittivity) of the sidewall increases toward a side where the antenna is present.

It is to be noted that the cover top covers the antenna from a region that is present in the direction in which the antenna transmits and/or receives electromagnetic waves and that is located apart from the antenna, and "sideways" refers to a region that is present in the direction perpendicular to the direction in which the antenna transmits and/or receives electromagnetic waves and that is located apart from the antenna, and "toward a side where the antenna is present" refers to the direction in which the sidewall of the antenna cover extends downward from the cover top.

The antenna cover of the first aspect may be such that the sidewall is structured such that a relative permittivity of the sidewall is uniform, and a physical thickness of the sidewall increases toward the side where the antenna is present.

Further, the antenna cover described above may be such that the sidewall is structured such that the physical thickness of the sidewall continuously increases toward the side where the antenna is present.

Further, the antenna cover described above may be such that an inner face of the sidewall is at a right angle to the cover top, and an outer face of the sidewall is at a constant angle larger than 0 degree but smaller than 90 degrees, to the inner face of the sidewall.

Further, the antenna cover described above may be such that the sidewall is structured such that the physical thickness of the sidewall increases stepwise toward the side where the antenna is present.

Further, the antenna cover described above may be such that the inner face of the sidewall is at a right angle to the cover top, and the outer face of the sidewall is stepped, having local faces perpendicular to the inner face of the sidewall and local faces at a constant angle larger than 0 degree but smaller than 90 degrees, to the inner face of the sidewall, which are alternately arranged.

Further, the antenna cover of the first aspect may be such that the physical thickness of the sidewall is uniform and the relative permittivity of the sidewall increases toward the side where the antenna is present.

The antenna cover and radar described above may be such that the thickness of the cover top is an integral multiple of a half wavelength, inside the cover top, of electromagnetic waves radiated from the antenna.

A second aspect of the invention relates to a radar having the antenna cover described above and a millimeter wave antenna.

According to the antenna cover and radar described above, the direction of the electromagnetic waves penetrating the sidewall of the cover changes midway. Therefore, the direction of the electromagnetic waves that directly reach the antenna by penetrating the cover top of the cover and the direction of the electromagnetic waves that penetrate the sidewall and then reach the antenna while undergoing reflections in the cover do not coincide with each other, resulting in suppressed interferences, that is, lessened cyclically wavy distortions of the antenna directivity. Therefore, for example, a radar can measure an azimuth angle, etc. with an improved accuracy.

Antenna covers described above are particularly suitable as millimeter wave antenna covers. Typically, the thicknesses of a cover top and sidewall of a millimeter wave antenna cover are substantially equal to the wavelength of electromagnetic waves inside the cover top and sidewall, and therefore directivity distortions tend to be large. For this reason, the invention is more effective than in the case of microwave antenna covers.

Further, in a case where an antenna cover according to the invention is used in a radar, preferably, the maximum detection angle range of the radar is equal to or wider than a range of ±15 degrees. This is because the wider the detection angle range of a radar, the larger the cyclical distortions of the directivity. More preferably, the maximum detection angle range of the radar is a range of ±20 to ±90 degrees.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the drawings. It is to be noted that the invention is not limited to any of them.

First Example Embodiment

Figure 1:
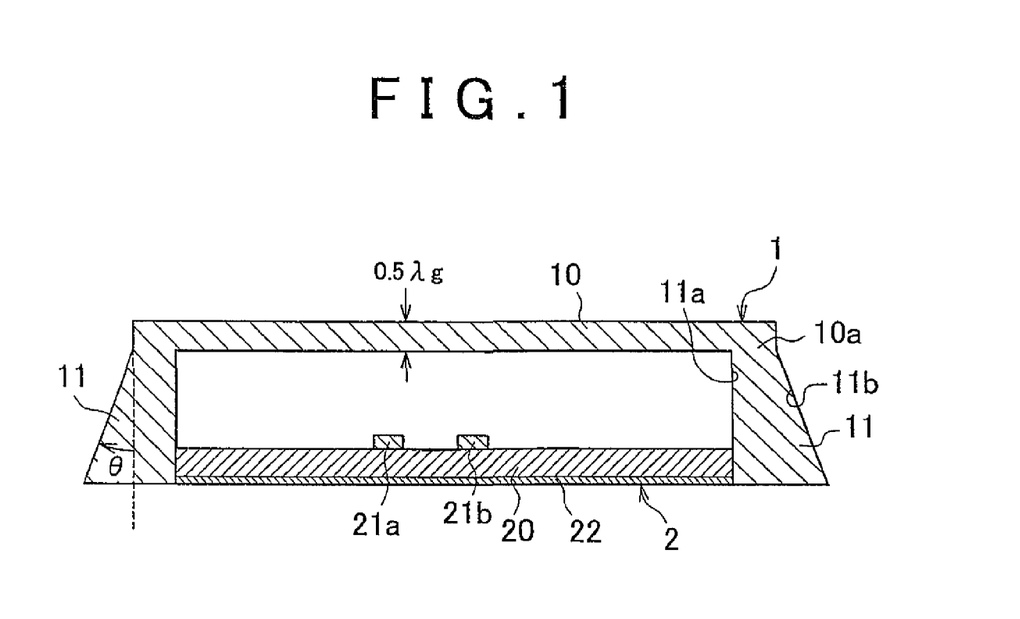
FIG. 1 is a diagram showing the structure of a cover according to a first example embodiment, which is used for a radar for a vehicle.

FIG. 1 is a diagram showing the structure of a cover 1 according to the first example embodiment, which covers a radar 2 provided in a vehicle. The radar 2 is constituted of a dielectric board 20 that is rectangular in its plan view, a ground plate 22 that is provided on one side of the dielectric board 20, and two microstrip antennas 21a and 21b that are provided on the other side of the dielectric board 20. The microstrip antennas 21a and 21b each send and receive electromagnetic waves of the frequency of 76.5 GHz. The electromagnetic wave receiving ranges of the microstrip antennas 21a and 21b are centered in the direction perpendicular to the dielectric board 20. In the following, the side where the microstrip antennas 21a and 21b are present with respect to the dielectric board 20 will be regarded as "the upper side".

The radar 2 is attached, for example, on the front grille of the vehicle and is used to detect the distances to the preceding vehicle, obstacles, and the like, and their azimuths, etc. The azimuth detection is performed using the phase-comparison monopulse method. More specifically, the azimuth of the detection target is detected based on the phase difference between the electromagnetic waves received by the microstrip antenna 21a and those received by the microstrip antenna 21b. Further, the distance to the detection target can be detected using the FM-CW method.

The cover 1 is a rectangular parallelepiped cover made of a dielectric material. The cover 1 is constituted of a cover top 10 that is a flat portion located above the surface of the dielectric board 20 on which the microstrip antennas 21a and 21b are provided, so as to be spaced apart from the microstrip antennas 21a, and 21b, and extending in parallel to the dielectric board 20, and a sidewall 11 meeting an edge 10a of the cover top 10 at a given angle. Further, the sidewall 11 is located out of the detection range of the radar 2. Thus, the cover top 10 of the cover 1 covers the radar 2 from above, while the sidewall 11 of the cover 1 covers the radar 2 sideways.

It is to be noted that the cover top 10 may be inclined at a constant angle to a plane that is level with respect to the wavefronts of the electromagnetic waves received by the microstrip antennas 21a and 21b, as long as the cover top 10 is flat, having a uniform thickness.

The dielectric material of which the cover 1 is made has a relative permittivity of 3.9. The cover 1 is manufactured by resin molding, such as injection molding. The thickness of the cover top 10 of the cover 1 is 0.5 λg. Note that "λg" represents the wavelength, inside the cover 1, of the electromagnetic waves radiated from the radar 2. That is, it is expressed as $\lambda g = \lambda 0/(\in r)^{1/2}$ where λ0 represents the wavelength of electromagnetic waves in a free space and ∈r represents the relative permittivity of the dielectric material, of which the cover 1 is made. With the cover top 10 of the cover 1 being 0.5 λg in thickness, the electromagnetic wave reflections at the cover top 10 are reduced, and thus electromagnetic waves can penetrate the cover top 10 more easily. In general, such reduction of electromagnetic wave reflections can be accomplished also when the thickness of the cover top 10 of the cover 1 is set to an integral multiple of 0.5 λg.

An inner face 11a of the sidewall 11 (i.e., the face of the sidewall 11 on the side where the radar 2 is present) is perpendicular to the cover top 10. On the other hand, an outer face 11b of the sidewall 11 (i.e., the face of the sidewall 11 on the side opposite to where the radar 2 is present) is at a constant angle θ, which is larger than 0 degree but is smaller than 90 degrees, to the inner face 11a such that the thickness of the sidewall 11 (i.e., the width of the sidewall 11 as measured horizontally (in the direction parallel to the dielectric board 20)) continuously increases, at a constant rate, toward the dielectric board 20 side (i.e., the side where the microstrip antennas 21a and 21b are present).

Using the cover 1 of the first example embodiment, which is structured as described above, as the cover for covering and thus protecting the radar 2 makes the cyclically wavy distortions of the radar directivity smaller than they are when a related-art cover is used, and therefore the radar 2 can detect the azimuth, etc., of the detection target more accurately.

Figure 2:
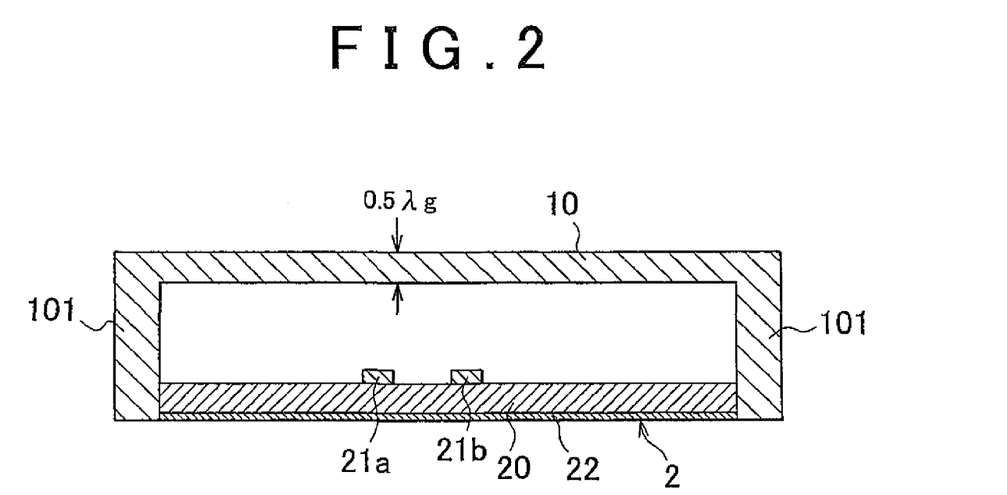
FIG. 2 is a diagram showing the structure of a cover according to a comparative example, which is used for a radar for a vehicle.

In the following, how the above effect is accomplished by the use of the cover 1 of the first example embodiment will be described in comparison with a cover of a comparative example. Referring to FIG. 2, the cover of the comparative example is identical in structure to the cover 1 of the first example embodiment except that it has a sidewall 101 having a uniform thickness in place of the sidewall 11 of the cover 1.

When electromagnetic waves are entering the cover obliquely with respect to the cover top 10, some of the electromagnetic waves penetrate the sidewall located out of the detection range of the radar 2 and then enter the cover. Then, after entering the cover through the sidewall, the electromagnetic waves propagate horizontally within the cover while undergoing multiple reflections due to the total reflection critical angle, and finally reach the microstrip antennas 21a and 21b.

Figure 3A:
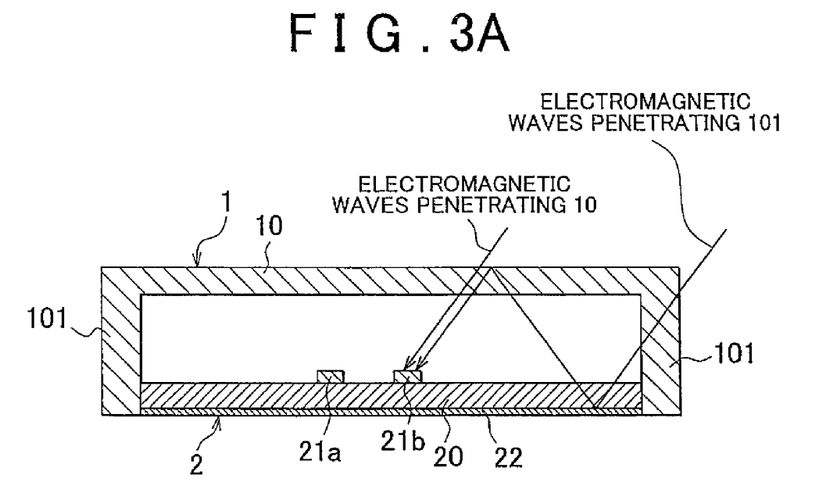
FIG. 3A is a diagram illustrating the state of the comparative example.

In such a situation, if the cover is the cover of the comparative example, because of the uniform thickness of the sidewall 101, the direction of the electromagnetic waves that directly reach the microstrip antennas 21a and 21b from the outside by penetrating the cover top 10 may coincide with the direction of the electromagnetic waves that enter the cover by penetrating the sidewall 101, which is located out of the range where electromagnetic waves are directly received, then propagates horizontally while undergoing multiple reflections within the cover, and finally reach the microstrip antennas 21a and 21b (refer to FIG. 3A). In such a case, interferences occur between the electromagnetic waves, resulting in cyclically wavy distortions of the radar directivity.

Figure 3B:
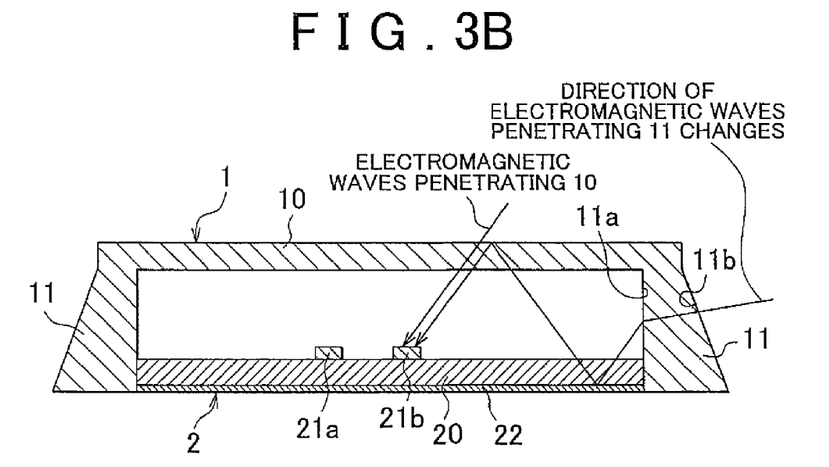
FIG. 3B is a diagram illustrating the effect of the invention.

On the other hand, if the cover is the cover 1 of the first example embodiment, since the thickness of the sidewall 11 increases toward the side where the microstrip antennas 21a and 21b are present (i.e., the thickness of the sidewall 11 increases such that it is larger at a point closer to the microstrip antennas 21a and 21b), the incident direction of the electromagnetic waves entering the cover 1 from the outside of the cover 1 by penetrating the sidewall 11 differs between when they pass through the outer face 11b of the sidewall 11 and when they enter the cover 1 from the inner face 11a of the sidewall 11. More specifically, their incident angle is smaller (i.e., closer to the angle of the horizontal line) when they pass through the outer face 11b of the sidewall 11 than when they enter the cover 1 from the inner face 11a of the sidewall 11 (refer to FIG. 3B). Therefore, the direction of the electromagnetic waves that directly reach the microstrip antennas 21a and 21b by penetrating the cover top 10 and the direction of the electromagnetic waves that penetrates the sidewall 11, then propagates horizontally while undergoing multiple reflections within the cover 1, and finally reach the microstrip antennas 21a and 21b do not coincide with each other, and thus no interference occurs between them, resulting in no radar directivity distortion.

Figure 4:
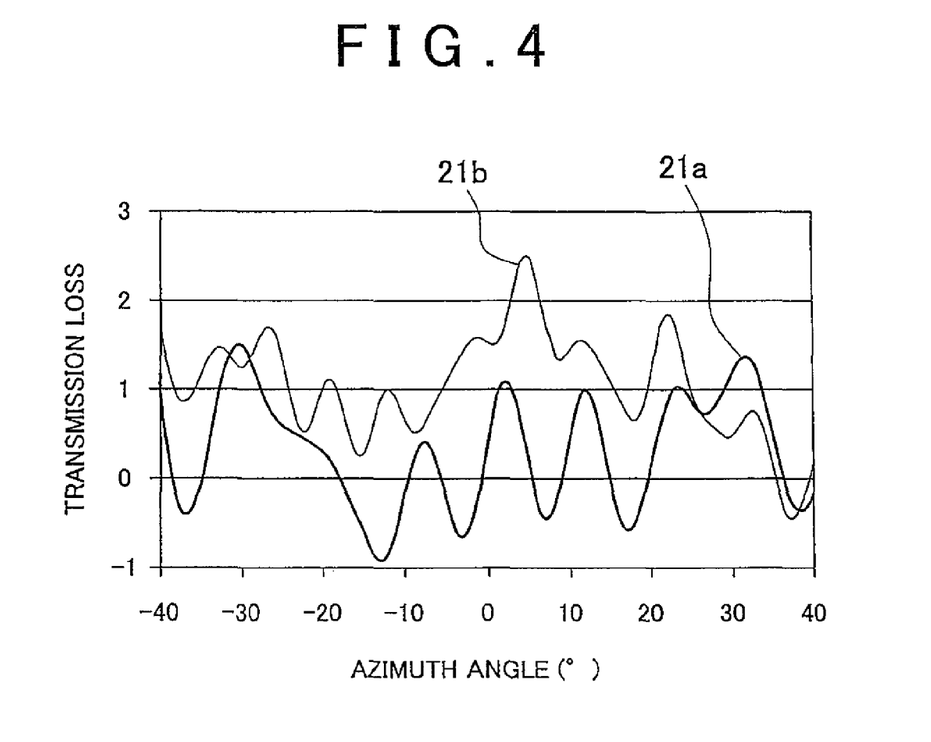
FIG. 4 is a graph illustrating the relation between the azimuth angle and the transmission loss, which was found when the cover of the comparative example was used.
Figure 5:
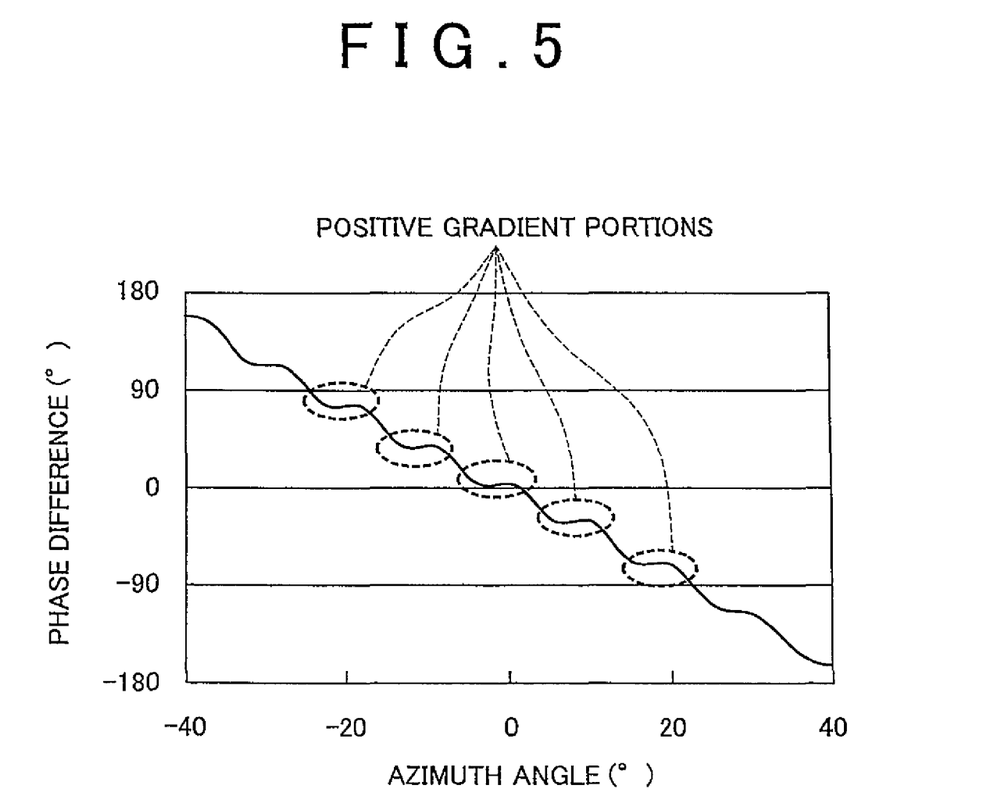
FIG. 5 is a graph illustrating the correlation between the azimuth angle and the phase difference, which was found when the cover of the comparative example was used.

FIG. 4 is a graph illustrating the relation between the azimuth angle at the microstrip antennas 21a and 21b and the corresponding transmission losses, which was found when the cover of the comparative example was used as the cover of the radar 2. FIG. 5 is a graph (phase map) illustrating the correlation between the azimuth angle and the phase difference between the electromagnetic waves received by the microstrip antenna 21a and those received by the microstrip antenna 21b. It is to be noted that FIGS. 4 and 5 illustrate the results of simulations performed using the transmission line matrix (TLM) method.

Referring to FIG. 4, for both of the microstrip antennas 21a and 21b, as the azimuth angle changes, the form of the transmission loss changes in a cyclically wavy form, and the worst value of the transmission loss is as high as 2.5 dB. Further, referring to FIG. 5, the gradient of the line indicating the correlation between the azimuth angle and the phase difference is not always negative in the azimuth angle range of −40 to 40 degrees, but the gradient locally, and cyclically, become positive. This is because when the phase difference has a specific value, the azimuth angle takes two or more values, that is, the azimuth angle and the phase difference are not in "one-to-one correspondence". Therefore, in some cases, the azimuth angle cannot be accurately measured from the phase difference.

Figure 6:
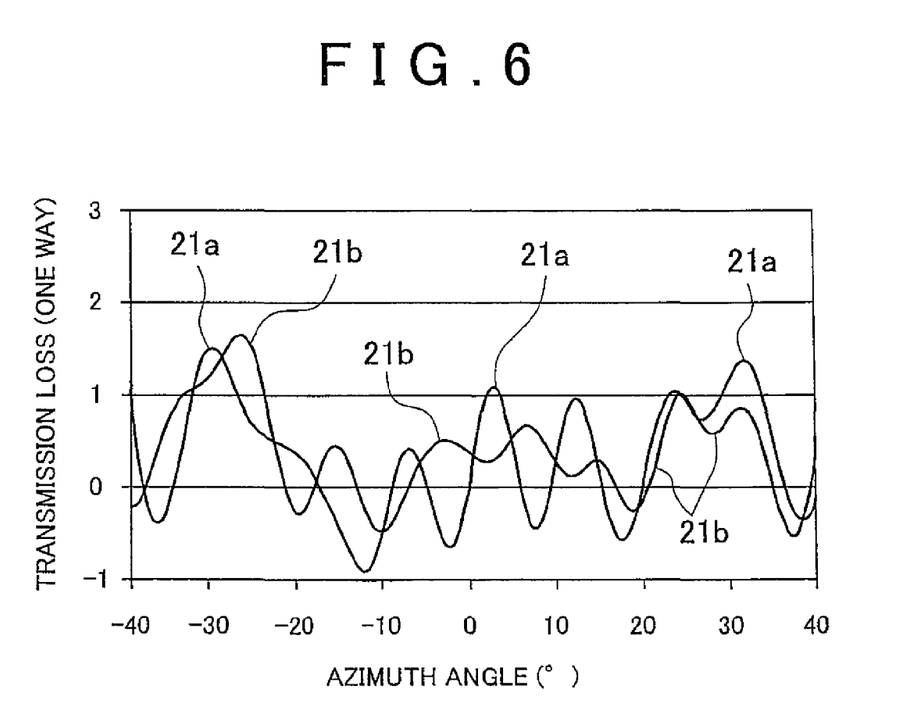
FIG. 6 is a graph illustrating the relation between the azimuth angle and the transmission loss, which was found when the cover of the first example embodiment was used.
Figure 7:
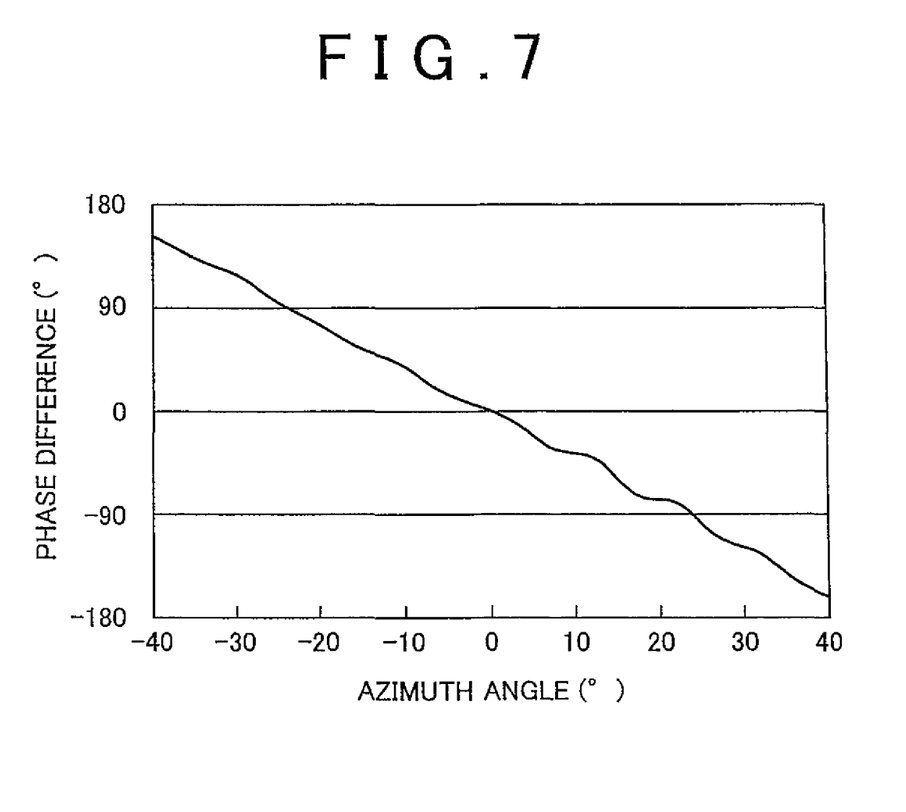
FIG. 7 is a graph illustrating the correlation between the azimuth angle and the phase difference, which was found when the cover of the first example embodiment was used.

Meanwhile, FIG. 6 is a graph illustrating the relation between the azimuth angle at the microstrip antennas 21a and 21b and the corresponding transmission losses, which was found when the cover 1 of the first example embodiment was used as the cover of the radar 2. FIG. 7 is a graph (phase map) illustrating the correlation between the azimuth angle and the phase difference. FIGS. 6 and 7 illustrate the results of simulations that were performed under the same conditions as those for FIGS. 4 and 5, while the angle θ of the outer face 11b to the inner face 11a of the sidewall 11 was set to 15 degrees.

Comparing FIGS. 4 and 6 with each other, it is found that the use of the cover 1 of the first example embodiment lessens the cyclically wavy distortions of the transmission loss with respect to changes in the azimuth angle. Further, the worst value of the transmission loss is 1.6 dB, that is, it is smaller than when the cover of the comparative example is used. Further, referring to FIG. 7, the line indicating the correlation between the azimuth angle of the detection target and the phase difference is generally straight, having no portion at which the gradient is positive, and the phase difference and the azimuth angle are in "one-to-one correspondence" in the range of −40 to 40 degrees. Therefore, it is possible to accurately measure the azimuth angle of the detection target.

Figure 8:
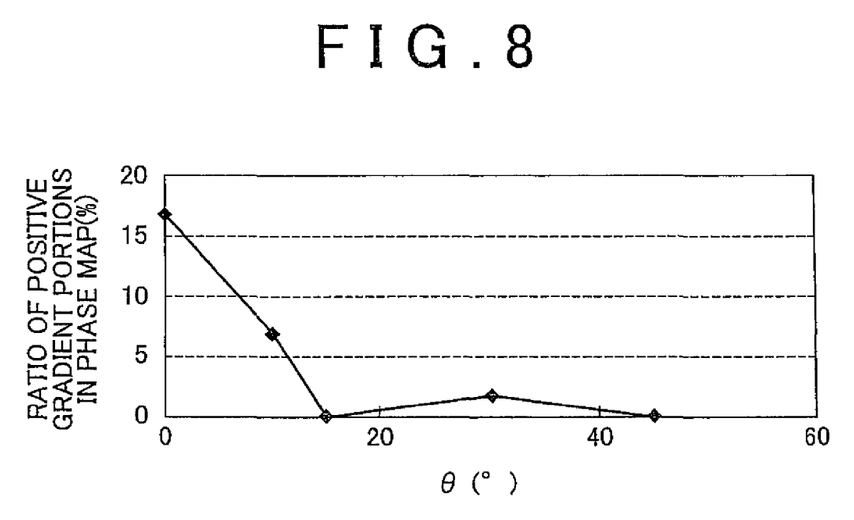
FIG. 8 is a graph illustrating the relation between the outer face angle θ and the ratio of the positive gradient portions in the phase map.

FIG. 8 is a graph illustrating how the ratio of positive gradient portions in the phase map changes as the angle θ of the outer face 11b to the inner face 11a of the sidewall 11 is changed. Note that the azimuth angle range is −40 to 40 degrees. The higher the ratio of positive gradient portions, the narrower the azimuth angle range in which the phase difference and the azimuth angle are in "one-to-one correspondence", that is, the lower the accuracy in measuring the azimuth angle. If the ratio of positive gradient portions is higher than 10%, it is not possible to correctly measure the azimuth angle from the phase difference even if correcting means is used. Referring to FIG. 8, if θ is equal to or larger than 10 degrees, the ratio of positive gradient portions is equal to or lower than 10%, and therefore the azimuth angle can be accurately measured from the phase difference using correcting means. In particular, if θ is equal to or larger than 15 degrees, the ratio of positive gradient portions is 0 to 2%, and therefore the azimuth angle can be more accurately measured. It is to be noted that θ is preferably 45 degrees or smaller. If it is larger than 45 degrees, the area occupied by the cover becomes large, making it difficult to realize "small size".

Second Example Embodiment

Figure 9:
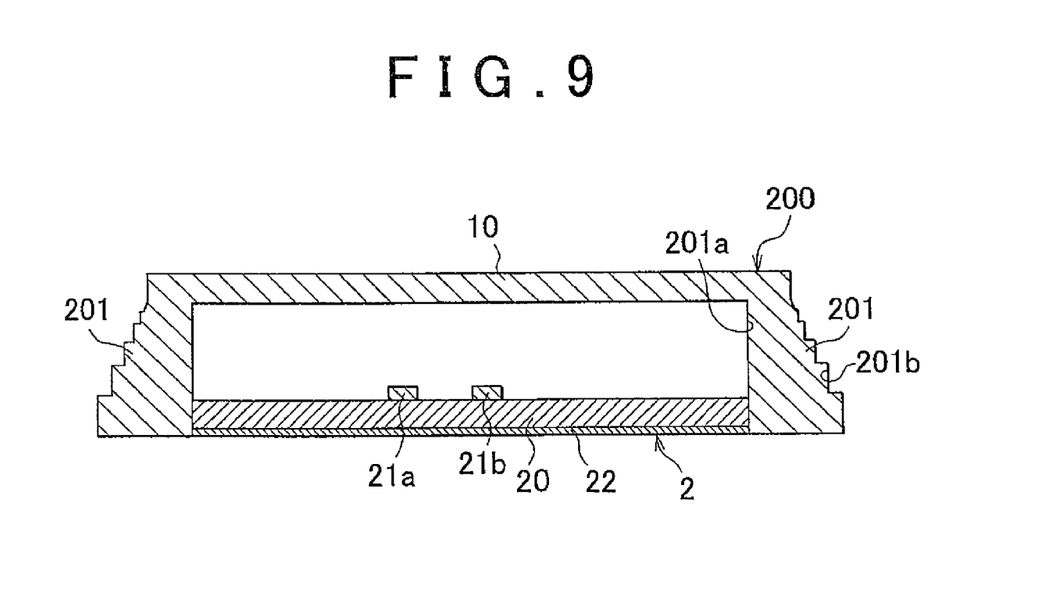
FIG. 9 is a diagram showing the structure of a cover according to a second example embodiment.

FIG. 9 is a diagram illustrating the structure of a cover 200 of the second example embodiment, which covers a radar 2 provided in a vehicle. The cover 200 is identical in structure to the cover 1 of the first example embodiment except that it has a sidewall 201, which is described below, in place of the sidewall 11 of the cover 1 of the first example embodiment.

As shown in FIG. 9, an outer face 201b of the sidewall 201 is stepped, having local faces parallel to the cover top 10 and local faces perpendicular to it, which are alternately arranged. An inner face 201a of the sidewall 201 is at a right angle to the cover top 10, as is the inner face 11a of the sidewall 11. According to this structure, the physical thickness of the sidewall 201 increases stepwise toward the side where the microstrip antennas 21a and 21b are present.

According to the cover 200 of the second example embodiment, the incident direction of the electromagnetic waves entering the cover 200 from the outside of the cover 200 by penetrating the sidewall 201 differs between when they pass through the local faces of the outer face 201b of the sidewall 201 that are parallel to the cover top 10 and when they enter the cover 200 from the inner face 201a of the sidewall 201. Further, because of the stepped form, there are many edges, and therefore the electromagnetic waves diffuse through the edges. Thus, as in the case where the cover 1 of the first example embodiment is used, the cyclically wavy distortions of the radar directivity can be lessened, and therefore the radar 2 can accurately detect the azimuth, etc. of the detection target.

Preferably, in order to further lessen the cyclically wavy distortions of the radar directivity, the height (the length in the direction perpendicular to the cover top 10) of each step at the stepped outer face 201b and the difference between the widths of the respective steps (the difference between the lengths of the respective steps as measured in the direction parallel to the cover top 10) are equal to or less than the wavelength ($\lambda$g) of the electromagnetic waves in the cover 200.

Third Example Embodiment

Figure 10:
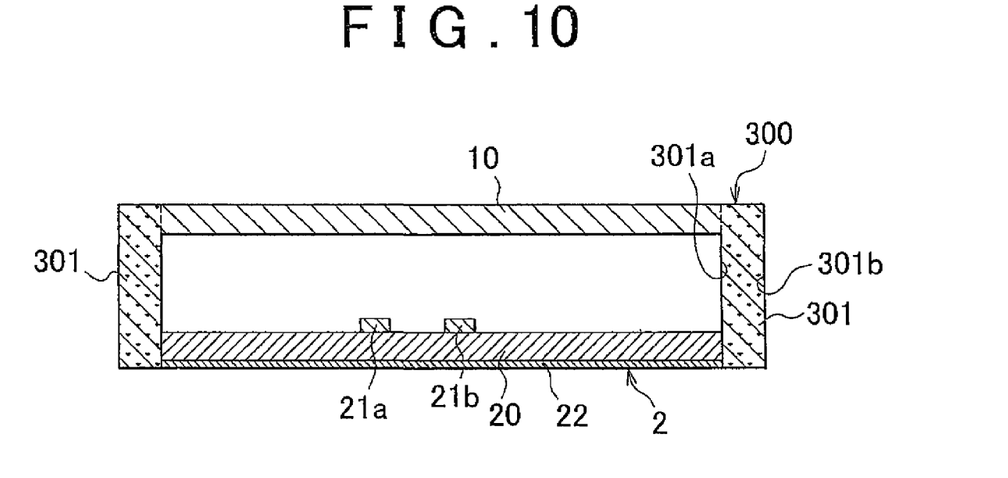
FIG. 10 is a diagram showing the structure of a cover according to a third example embodiment.

FIG. 10 is a diagram showing the structure of a cover 300 of the third example embodiment, which covers a radar 2 provided in a vehicle. The cover 300 is identical in structure to the cover 1 of the first example embodiment except that it has a sidewall 301, which is described below, in place of the sidewall 11 of the cover 1.

An inner face 301a and an outer face 301b of the sidewall 301 both meet the cover top 10 at a right angle, and the physical thickness of the sidewall 301 is uniform. The sidewalk 301 is made of such a dielectric material or materials that the relative permittivity increases toward the side where the microstrip antennas 21a and 21b are present.

According to the cover 300 of the third example embodiment, the electric thickness of the sidewall 301 is increased toward the side where the microstrip antennas 21a and 21b are present (i.e., increased such that it is larger at a point closer to the microstrip antennas 21a and 21b) by changing the relative permittivity of the sidewall 301, rather than changing the physical thickness of the sidewall 301. According to this structure, too, the incident direction of the electromagnetic waves that enter the cover 300 from the outside of the cover 300 by penetrating the sidewall 301 can be made different between when they pass through the outer face 301b of the sidewall 301 and when they enter the cover 300 from the inner face 301a of the sidewall 301. Therefore, as in the case where the cover 1 of the first example embodiment is used, the cyclically wavy distortions of the radar directivity can be lessened, and thus the radar 2 can accurately detect the azimuth, etc. of the detection target.

While a phase-comparison monopulse radar is used as the radar in each of the example embodiments, antenna covers according to the invention are not limited to phase-comparison monopulse radar covers, but they may be covers for radars of various other types. For example, they may be covers for Digital Beam Forming (DBF) radars.

While the sidewall is structured such that its electric thickness increases toward the side where the antennas are present, by changing the physical thickness of the sidewall in the first and second example embodiments and by changing the relative permittivity of the sidewall in the third example embodiment, the sidewall may be structured such that its electric thickness increases toward the side where the antennas are present, by changing both the physical thickness and the relative permittivity.

The antenna cover may be formed in any shape as long as it has a cover top and a sidewall each having the shape as described in the description of the foregoing example embodiments. For example, it may be formed in the shape of a rectangular parallelepiped or in the shape of a rectangular parallelepiped with its corners and/or edges rounded. The cover top may be inclined in the direction, perpendicular to the direction in which electromagnetic waves are transmitted and received.

As described in the description of the foregoing example embodiments, the sidewall may have any structure as long as its electric thickness (the electric length in the direction parallel to the cover top) increases toward the side where the antennas are present, and such a structure can be realized by changing one or both of the physical thickness and relative permittivity. Further, the rate at which the electric thickness increases may either be constant or nonconstant.

In a case where the physical thickness of the sidewall is changed, the sidewall may be formed in any shape as long as the physical thickness increases toward the side where the antennas are present. That is, the sidewall may be shaped such that the physical thickness continuously increases or such that it increases stepwise. However, if the angles of the inner face (the face on the antenna side) and outer face (the face on the side opposite to the antenna side) of the sidewall to the cover top are smaller than 90 degrees, it is difficult to manufacture the cover by resin molding, such as injection molding. Thus, in view of the ease of production, preferably, the sidewall is shaped such that its physical thickness gradually increases, by setting the angle of the inner face to the cover top to a right angle and stepping or inclining the outer face. In a case where the outer face of the sidewall is inclined, preferably, the angle of the outer face to the inner face of the sidewall is set to 10 degrees or larger. In this case, it is possible to further lessen the cyclically wavy distortions of the antenna directivity. More preferably, it is set to 15 degrees or larger. Further, if the angle of the outer face to the inner face is too large, the area occupied by the cover becomes large. Therefore, preferably, the angle of the outer face to the inner face is set to 45 degrees or smaller. Further, the angle of the outer face to the inner face is not necessarily constant. That is, it may change stepwise or continuously.

Preferably, the physical thickness of the cover top is set to an integral multiple of $\lambda g/2$ where $\lambda g$ is the wavelength, inside the cover top, of the electromagnetic waves radiated from the antennas. In this case, the electromagnetic wave reflections at the cover top can be suppressed, facilitating penetration of electromagnetic waves.

Antenna covers according to the invention are suitable as millimeter-wave radar covers, but are not limited to them.

The invention claimed is:
1. An antenna cover that covers a radar which comprises two antennas for receiving electromagnetic waves, which detects the distance to an obstacle and which detects the azimuth of the obstacle based on an phase difference between the electromagnetic waves received by the two antennas, comprising:
   a cover top that is flat, that faces the two antennas and that is spaced apart from the two antennas; and
   a thickness of the sidewall, that is a value obtained by dividing the physical thickness of the sidewall by a relative permittivity of the sidewall, increases toward a side where the two antennas are present, wherein the sidewall is structured such that a relative permittivity of the sidewall is uniform, and the physical thickness of the sidewall continuously increases toward the side where the antennas are present;

wherein an inner face of the sidewall is at a right angle to the cover top, and an outer face of the sidewall is at a constant angle larger than 15 degrees but smaller than 45 degrees, to the inner face.

2. The antenna cover according to claim 1, wherein the sidewall is structured such that the physical thickness of the sidewall increases stepwise toward the side where the antennas are present.

3. The antenna cover according to claim 2, wherein an inner face of the sidewall is at a right angle to the cover top, and an outer face of the sidewall is stepped, having local faces perpendicular to the inner face and local faces at a constant angle larger than 0 degree but smaller than 90 degrees, to the inner face, which are alternately arranged.

4. The antenna cover according to claim 1, wherein a thickness of the cover top is an integral multiple of a half wavelength, within the cover top, of electromagnetic waves radiated from the antennas.

5. A radar comprising:
an antenna cover according to claim 1, and
two millimeter wave antennas.

6. The radar according to claim 5, wherein a thickness of the cover top is an integral multiple of a half wavelength, within the cover top, of electromagnetic waves radiated from the antennas.

* * * * *